(12) United States Patent
Liu

(10) Patent No.: US 10,421,871 B2
(45) Date of Patent: Sep. 24, 2019

(54) MATERIALS AND METHODS

(71) Applicant: The University of Melbourne, Victoria (AU)

(72) Inventor: Zhe Liu, Victoria (AU)

(73) Assignee: The University of Melbourne, Parkville (AU)

( * ) Notice: Subject to any disclaimer, the term of this patent is extended or adjusted under 35 U.S.C. 154(b) by 58 days.

(21) Appl. No.: 15/812,999

(22) Filed: Nov. 14, 2017

(65) Prior Publication Data

US 2018/0134903 A1 May 17, 2018

Related U.S. Application Data

(63) Continuation of application No. 14/655,091, filed as application No. PCT/CN2012/087432 on Dec. 25, 2012, now abandoned.

(51) Int. Cl.

| | | |
|---|---|---|
| *C09D 5/16* | (2006.01) | |
| *C03C 17/32* | (2006.01) | |
| *C03C 17/00* | (2006.01) | |
| *C09D 101/02* | (2006.01) | |
| *C09D 101/04* | (2006.01) | |
| *C09D 101/06* | (2006.01) | |
| *C09D 101/10* | (2006.01) | |
| *C09D 101/12* | (2006.01) | |
| *C09D 101/14* | (2006.01) | |
| *C09D 101/16* | (2006.01) | |
| *C09D 101/18* | (2006.01) | |
| *C09D 101/28* | (2006.01) | |
| *C09D 103/02* | (2006.01) | |
| *C09D 103/04* | (2006.01) | |
| *C09D 103/06* | (2006.01) | |
| *C09D 103/08* | (2006.01) | |
| *C09D 103/10* | (2006.01) | |
| *C09D 105/14* | (2006.01) | |
| *C09D 189/00* | (2006.01) | |

(52) U.S. Cl.
CPC .......... *C09D 5/1637* (2013.01); *C03C 17/002* (2013.01); *C03C 17/003* (2013.01); *C03C 17/32* (2013.01); *C09D 5/16* (2013.01); *C09D 101/02* (2013.01); *C09D 101/04* (2013.01); *C09D 101/06* (2013.01); *C09D 101/10* (2013.01); *C09D 101/12* (2013.01); *C09D 101/14* (2013.01); *C09D 101/16* (2013.01); *C09D 101/18* (2013.01); *C09D 101/28* (2013.01); *C09D 101/284* (2013.01); *C09D 101/286* (2013.01); *C09D 103/02* (2013.01); *C09D 103/04* (2013.01); *C09D 103/06* (2013.01); *C09D 103/08* (2013.01); *C09D 103/10* (2013.01); *C09D 105/14* (2013.01); *C09D 189/00* (2013.01); *C03C 2217/70* (2013.01); *C03C 2218/11* (2013.01); *C03C 2218/32* (2013.01); *C03C 2218/365* (2013.01); *Y10T 428/1321* (2015.01); *Y10T 428/1355* (2015.01); *Y10T 428/31634* (2015.04); *Y10T 428/31678* (2015.04); *Y10T 428/31703* (2015.04); *Y10T 428/31971* (2015.04)

(58) Field of Classification Search
CPC ................................ C09D 5/1637; C09K 3/18
See application file for complete search history.

(56) References Cited

U.S. PATENT DOCUMENTS

| | | | |
|---|---|---|---|
| 3,728,127 A | 4/1973 | Palmer | |
| 3,896,753 A | 7/1975 | Sheperd et al. | |
| 4,297,137 A | 10/1981 | Sachetto et al. | |
| 5,336,414 A | 8/1994 | DiAngelo | |
| 6,191,116 B1 | 2/2001 | Kasica et al. | |
| 6,896,928 B2 | 5/2005 | Allaire et al. | |
| 9,186,627 B2 * | 11/2015 | McGinnis | B01D 61/002 |
| 2003/0124243 A1 * | 7/2003 | Cotten | A23G 3/0004 426/660 |
| 2003/0228470 A1 | 12/2003 | Allaire et al. | |
| 2004/0258655 A1 | 12/2004 | Qian et al. | |
| 2006/0201389 A1 | 9/2006 | Svensson | |
| 2006/0240159 A1 | 10/2006 | Cash et al. | |
| 2007/0059273 A1 | 3/2007 | Price et al. | |
| 2007/0258940 A1 | 11/2007 | Hamilton et al. | |

(Continued)

FOREIGN PATENT DOCUMENTS

| | | |
|---|---|---|
| JP | S56102584 A | 8/1981 |
| JP | 2003326544 A | 11/2003 |

(Continued)

OTHER PUBLICATIONS

European Search Report, for Application No. EP 12890638.5, "Materials and Methods," consisting of 9 pages, dated Apr. 13, 2016.

(Continued)

*Primary Examiner* — Liam J Heincer

(74) *Attorney, Agent, or Firm* — Hamilton, Brook, Smith & Reynolds, P.C.

(57) ABSTRACT

The invention relates to a substrate intended in use to contact a fouling agent, the substrate including a coating comprising polysaccharide, which coating serves to reduce or prevent fouling of the substrate caused by contact from the fouling agent, in comparison to an equivalent uncoated substrate. The invention also relates to the anti-fouling coating, to apparatus comprising such coating and to related methods of reducing or preventing fouling of a substrate intended in use to contact a fouling agent.

9 Claims, 2 Drawing Sheets

(56) References Cited

U.S. PATENT DOCUMENTS

| | | | |
|---|---|---|---|
| 2009/0039035 A1* | 2/2009 | Whitekettle | A01N 47/44 210/764 |
| 2009/0188861 A1 | 7/2009 | Higgin | |
| 2009/0238811 A1* | 9/2009 | McDaniel | A61L 2/00 424/94.2 |
| 2009/0242177 A1* | 10/2009 | Morioka | C09D 1/00 165/133 |
| 2010/0000575 A1* | 1/2010 | Romer | B08B 9/00 134/18 |
| 2010/0096114 A1* | 4/2010 | Yoshida | C09D 1/00 165/133 |
| 2010/0278994 A1 | 11/2010 | Klemaszewski | |
| 2010/0305062 A1 | 12/2010 | Onsoyen et al. | |
| 2011/0030578 A1 | 2/2011 | Schulz et al. | |
| 2011/0070376 A1 | 3/2011 | Wales et al. | |
| 2011/0094540 A1* | 4/2011 | Morken | B29C 45/1753 134/22.1 |
| 2011/0123475 A1* | 5/2011 | Dias | A61L 29/16 424/78.3 |
| 2011/0168623 A1* | 7/2011 | Uda | A01N 31/16 210/494.1 |
| 2011/0240064 A1 | 10/2011 | Wales et al. | |
| 2011/0253621 A1 | 10/2011 | Kim et al. | |
| 2011/0305909 A1 | 12/2011 | Weaver et al. | |
| 2012/0276251 A1* | 11/2012 | Vurma | A23L 29/219 426/73 |
| 2013/0108819 A1 | 5/2013 | Guezennec | |
| 2013/0334130 A1 | 12/2013 | Ganguli et al. | |
| 2014/0030534 A1 | 1/2014 | Carlson et al. | |
| 2015/0010731 A1 | 1/2015 | Iwata et al. | |
| 2015/0329725 A1 | 11/2015 | Liu | |
| 2017/0156350 A1* | 6/2017 | Van Seeventer | A23G 1/56 |

FOREIGN PATENT DOCUMENTS

| | | | |
|---|---|---|---|
| WO | 2006002630 | A1 | 1/2006 |
| WO | 2008064417 | A1 | 6/2008 |
| WO | 2009062518 | A1 | 5/2009 |
| WO | 2001081008 | | 11/2011 |
| WO | 2013153124 | A1 | 10/2013 |
| WO | 2014100976 | | 7/2014 |

OTHER PUBLICATIONS

International Search Report and Written Opinion for Int'l Application No. PCT/CN2012/087432, titled: "Materials and Methods," dated Oct. 3, 2013.

International Preliminary Report on Patentability for Int'l Application No. PCT/CN2012/087432, titled: "Materials and Methods," dated Jun. 30, 2015.

Incropera, F.P. And D.P. DeWitt (1996). Introduction to Heat Transfer, John Wiley & Sons, Chapter 11, pp. 544-593.

Bansal, B. et al., "Effect of Temperature and Power Frequency on Milk Fouling in an Ohmic Heater," Trans IChemE, Part C, 84(C4): 286-291 (Dec. 2006).

Beuf, M et al., "Fouling and Cleaning of Modified Stainless Steel Plate Heat Exchangers Processing Milk Products," ECI Conference on heat exchanger fouling and cleaning, pp. 1-8 (2003).

Burton, H., "Reviews of the Progress of Dairy Science," J. Dairy Res., 35: 317-330 (1968).

Changani, S.D. et al., "Engineering and Chemical Factors Associated with Fouling and Cleaning in Milk Processing," Experimental Thermal and Fluid Science, 14: 392-406 (1997).

Chen, X.D. et al., "Investigation of the Influence of Surface and Bulk Temperatures Upon Fouling of Milk Components onto a Stainless Steel Probe," Proceedings of Fouling and Cleaning in Food Processing, University of Cambridge, Official publications of the European Communities, pp. 25-32 (2008).

Chen, X.D. et al., "Modeling Whey Protein Based Fouling of Heat Exchangers—Further Examining the Deposition Mechanisms," International Conference on Heat Exchanger Fouling Fundamental Approaches and Technical Solutions, Davos, Switzerland, pp. 153-162 (2001).

De Jong, P. et al., "Fouling of Heat Treatment Equipment in Relation to the Denaturation of β-lactoglobulin," Journal of the Society of Dairy Technology, 45(1): 3-8 (Feb. 1992).

Delplace, F. et al., "A Reaction Engineering Approach to the Analysis of Fouling by Whey Proteins of a Six-Channels-per-Pass Plate Heat Exchanger," Journal of Food Engineering, 34: 91-108 (1997).

Delsing, B.M.A. et al., "Fouling of heat transfer surfaces by dairy liquids," Neth. Milk Dairy J., 37: 139-148 (1983).

Khan, M.S. et al., "Fouling resistance model for prediction of $CaCO_3$ scaling in AISI 316 tubes," Heat and Mass Transfer, 32: 73-79 (1996).

Lalande, M. et al., "Fouling of a plate heat exchanger used in ultra-high-temperature sterilization of milk," Journal of Dairy Research, 51: 557-568 (1984).

Liu, Z. et al., "Influence of Adsorption Pre-Treatment on the Extent of Dairy Fouling of Heat Transfer Surfaces," Fouling and Cleaning in Food Processing, Cambridge, UK (2010).

Mantel, M. et al, "Influence of the Surface Chemistry on the Wettability of Stainless Steel," Surface and Interface Analysis, 21: 595-605 (1994).

First Examination Report for New Zealand Application No. 631843, dated Sep. 28, 2015.

Non-Final Office Action for U.S. Appl. No. 14/655,091, "Materials and Methods," dated Jun. 14, 2017.

Hill, Milk Properties and Characteristics, American Cheese Society (2011).

* cited by examiner

MATERIALS AND METHODS

RELATED APPLICATIONS

This application is a continuation of U.S. application Ser. No. 14/655,091, filed Jun. 24, 2015, which is the U.S. National Stage of International Application No. PCT/CN2012/087432, filed on Dec. 25, 2012, published in English. The entire teachings of the above applications are incorporated herein by reference.

FIELD OF THE INVENTION

The present invention relates to anti-fouling coatings and to substrates and apparatus comprising such coatings. The invention also relates to methods of coating substrates that serve to reduce or prevent the fouling on such coated substrates in comparison to equivalent uncoated substrates.

BACKGROUND

There are a wide range of situations where substrates come into contact with fouling agents that give rise to deposition onto the substrate over time. For example, fouling is common in marine and aquatic environments, on substrates such as domestic appliances, glass or other surfaces. Heat exchangers and other machinery that come into contact with water (particularly hard water) will be subject to fouling or scaling over time and many components of food and beverage processing equipment and other industrial machinery or appliances will often experience unwanted plaque build-up or fouling. Depending upon the context, fouling of substrates can be unsightly, can give rise to hygiene or health and safety issues, can necessitate costly down time of equipment and maintenance/cleaning costs as well as reducing the efficiency of equipment operation. There is therefore a pressing need, and significant commercial motivation, to develop technologies capable of preventing or reducing fouling of substrates on exposure to fouling agents such as food and beverages, industrial chemicals, water, milk and other dairy products, marine or aquatic environments, sewage and the like.

The dairy industry is one that is particularly affected by the fouling of equipment, requiring frequent and expensive cleaning steps to restore equipment performance following fouling. Not only are the cost of cleaning and the down time of equipment significant problems, but the necessary cleaning steps require the use of water, energy and chemical cleaning agents such as strong acids and/or alkali that are not environmentally friendly.

Milk fouling in the dairy industry is particularly severe due to the thermal instability of the milk system (Changani and Belmar-Beiny 1997). The literature suggests that protein and minerals may be all involved in the occurrence of milk fouling, which starts with surface adsorption and involves different mechanisms under different conditions (temperature and flow pattern) (Burton 1968; Delsing and Hiddink 1983). Heat induced reactions then take place to build up fouling layers to eventually form milk stones (de Jong and Bouman 1992; Delplace, Leuliet et al. 1997; Chen and Bala 1998; Chen and Chen 2001; Bansal and Chen 2006).

Milk deposits can be characterised with respect to processing temperature as Type A and Type B deposits. Type A deposits are found at temperatures below 110° C., and consists of 50-60 wt % proteins and 30-35 wt % minerals, which are much higher proportions than those found in raw milk. The Type A deposit is creamy and white and is known as protein fouling. However, if it is overcooked it can become brown in colour and very much harder. Type B deposits are found at heating temperatures above 110° C., and consist of 15-20 wt % protein and up to 70 wt % minerals (Lalande, Tissier et al. 1984). The major mineral compound is understood to be calcium phosphate. This type of deposit is harder than the Type A deposits, is grey in colour and is known as mineral fouling (Burton 1968).

The unwanted deposition on the surfaces of heat exchanger apparatus (in both the dairy industry and in other contexts) represents an additional thermal resistance to heat transfer, which reduces the thermal-hydraulic performance for the heat transfer equipment.

One approach that has been considered in attempts to reduce surface fouling, for example in the dairy industry, is to change the characteristics of the heat exchanger surface in the hope of altering the interaction with the fouling agent that leads to adsorption of the first deposition layer. The theory is that as the base layer structure is changed, the subsequent fouling reactions would also be altered and hopefully inhibited (Liu, Chan et al. 2010). In the past, anti-fouling coating technologies such as Ni-P-PTFE coatings, Xylan®, Silica, SiOx, Exvalibur® and Diamond-like Carbon (DLC) coatings have been tested in order to reduce the milk fouling during thermal treatment. While such coatings have changed the fouling behaviour of heat exchangers coated by these means, the results have not been commercially acceptable (Beuf, M., G. Rizzo, et al. (2004). For example, the reduction in fouling has either not been significant or the coatings have resulted in other problems such as de-lamination or shedding into the product stream, degradation of the substrate or product contamination.

Water scaling is problematic in many industries, particularly where hard water is involved. Scale on a heat exchanger surface generally produces a higher resistance to heat transfer. In cooling water applications, hard water calcium and magnesium form combinations that come out of solution easily and form unwanted deposits (Sultan Khan, Zubair et al. 1996). With alteration of surface characteristics, it may also be possible to minimise the effects of water scaling.

In view of this background it is desired to develop a means of preventing or reducing the fouling experienced on a substrate when it comes into contact with a fouling agent. For example it would be useful to develop a means of preventing or reducing the fouling that takes place on a range of different substrates and which is caused by exposure to a variety of different fouling agents.

Other aspects of the present invention will become apparent form the following detailed description.

SUMMARY

According to one embodiment of the present invention there is provided a substrate intended in use to contact a fouling agent, said substrate including a coating comprising polysaccharide, which coating serves to reduce or prevent fouling of the substrate caused by contact from the fouling agent, in comparison to an equivalent uncoated substrate.

According to another embodiment of the present invention there is provided an anti-fouling coating for a substrate that is intended in use to contact a fouling agent, wherein said coating comprises polysaccharide and wherein the coating serves to reduce or prevent fouling of the substrate caused by contact from the fouling agent, in comparison to an equivalent uncoated substrate.

According to another embodiment of the present invention there is provided an apparatus comprising a substrate intended in use to contact a fouling agent, said substrate including a coating comprising polysaccharide, which coating serves to reduce or prevent fouling of the substrate caused by contact from the fouling agent, in comparison to an equivalent uncoated substrate.

According to another embodiment of the invention there is provided a method of reducing or preventing fouling of a substrate intended in use to contact a fouling agent, in comparison to an equivalent untreated substrate, which comprises treating the substrate with aqueous polysaccharide to produce a polysaccharide comprising coating on the substrate.

In one aspect the polysaccharide comprises starch or modified starch, although it can also comprise a mixture of starches and/or modified starches. For example, the polysaccharide can comprise one or more of rice starch, maize starch, potato starch, dextrin starch, hydrolysed starch, octenyl succinic anhydride (OSA) starch, alkaline-modified starch, bleached starch, oxidised starch, enzyme-treated starch, monostarch sulphate, distarch phosphate, acetylated starch, hydroxypropylated starch, hydroxyethyl starch, cationic starch and carboxymethylated starch.

In another aspect of the invention the polysaccharide comprises cellulose, hemicellulose, hydrolysed cellulose or a cellulose derivative and the polysaccharide can comprise a mixture of celluloses, hemicelluloses, hydrolysed celluloses and/or cellulose derivatives. For example, the polysaccharide can comprise one or more of cellulose $I_\alpha$ cellulose $I_\beta$ cellulose II, cellulose III, cellulose IV, cellulose acetate, cellulose triacetate, cellulose propionate, cellulose acetate propionate, cellulose acetate butyrate, cellulose nitrate, cellulose sulphate, methyl cellulose, ethyl cellulose, ethylmethyl cellulose, hydroxyethyl cellulose, hydroxypropyl cellulose, hydroxyethylmethyl cellulose, hydroxypropylmethyl cellulose, ethylhydroxyethyl cellulose, carboxymethyl cellulose and acid hydrolysed cellulose.

In another embodiment of the invention the coating further comprises protein or polypeptide bound to the polysaccharide. For example, the protein or polypeptide can comprise one or more of whey protein or casein.

In one specific aspect of the invention the polysaccharide comprises dextrin starch and octenyl succinic anhydride starch and the protein comprises casein. For example, the substrate can comprise one or more of metal, metal alloy, ceramic, glass, graphite, composite material, concrete or polymer and a specific example is stainless steel. For example, the apparatus can either be, or can be an element of, food, dairy or beverage processing equipment; a pump, pipe, conduit, connector or plumbing fitting; a heat exchanger, radiator, heating element, hot water service, kettle or jug; a commercial or domestic appliance, washing machine, dish washer, clothes washing machine, air conditioner; a marine or aquatic vehicle, structure or fixture; a window, windscreen, lens, bottle or storage vessel; a building component or vehicle panel.

In specific embodiments the method comprises treating the substrate with aqueous polysaccharide using an aqueous mixture, dispersion or solution of polysaccharide of from about 0.5% to about 20% w/w, from about 1.0% to about 15% w/w, from about 2% to about 10% w/w or from about 4% to about 8% w/w. For example, treating the substrate with aqueous polysaccharide can be conducted using an aqueous mixture, dispersion or solution of polysaccharide with pH of from about 3 to about 10 or from about 6 to about 8. The substrate can be treated with the aqueous mixture, dispersion or solution of polysaccharide at a temperature of from about 50° C. to about 150° C., from about 65° C. to about 140° C. or from about 85° C. to about 120° C. For example, the substrate can be treated with the aqueous mixture, dispersion or solution of polysaccharide for a period of from about 1 hour to about 48 hours or from about 4 hours to about 12 hours. In one aspect the aqueous mixture, dispersion or solution of polysaccharide is flowing at a rate of from about 5 L/min to about 100 L/min, such as from about 15 L/min to about 70 L/min.

In another aspect of the invention the method further comprises treating the polysaccharide coated substrate with an aqueous mixture, dispersion or solution of protein or polypeptide, such as for example, one or more of whey protein and casein, such as α-, β- and k-casein. For example, the aqueous mixture, dispersion or solution of protein or polypeptide (for example casein or casein and whey protein) can comprise from about 2% to about 16%, such as from about 8% to about 14% w/w of protein and/or polypeptide and the aqueous mixture, dispersion or solution of protein and/or polypeptide can comprise milk or a casein comprising milk fraction. The aqueous mixture, dispersion or solution of protein or polypeptide can, for example, have pH of from about 4 to about 10, such as from about 6 to about 8 and the hydrophilic polysaccharide coated substrate can for example be treated with the aqueous mixture, dispersion or solution of protein or polypeptide at a temperature of from about 65° C. to about 98° C., such as from about 75° C. to about 95° C. For example, the treatment with the aqueous mixture, dispersion or solution of protein or polypeptide can be for a period of from about 15 mins to about 6 hours, such as from about 1 hour to about 2 hours and the said aqueous mixture, dispersion or solution of protein or polypeptide can be flowing at a rate of from about 20 L/min to about 100 L/min, such as from about 30 L/min to about 70 L/min.

In a further aspect of the invention the method further comprises a step of rinsing with water or dilute alkali (such as NaOH), which can, for example, be conducted at a temperature of from about 20° C. to about 80° C. for a period of between about 5 mins and about 1 hour.

According to a still further embodiment of the invention there is provided a substrate intended in use to contact a fouling agent that has been treated to reduce or prevent fouling in comparison to an equivalent untreated substrate, according to the method outlined above. There are also provided apparatus comprising the substrates so produced.

BRIEF DESCRIPTION OF THE DRAWINGS

The present invention will be described further, and by way of example only, with reference to the figures, wherein.

DETAILED DESCRIPTION

Figure 1:
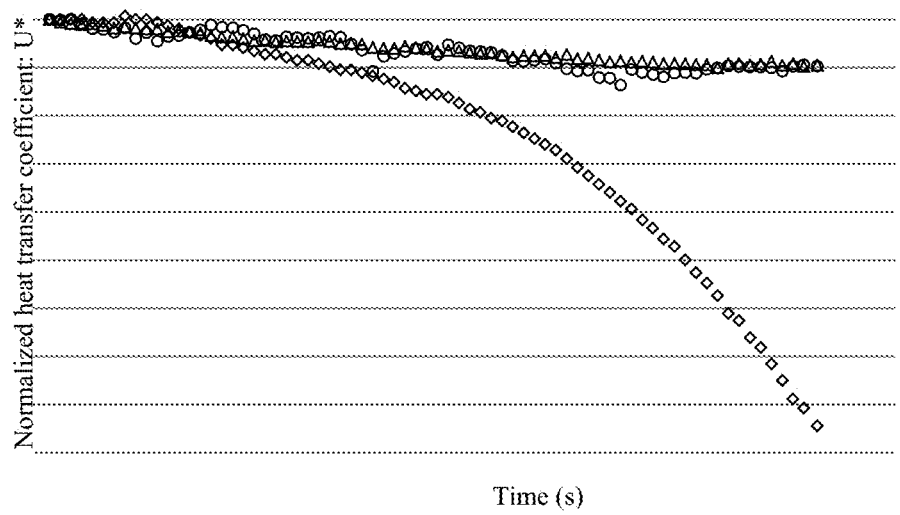
FIG. 1 shows a graph of U* evaluation over time during milk fouling where (Δ) is the control (running water), (○) is the coated heat exchanger (milk processing) and (◇) is the uncoated heat exchanger (milk processing)

A description of example embodiments follows. The reference to any prior art in this specification is not, and should not be taken as, an acknowledgment or any form of suggestion that that prior art forms part of the common general knowledge in Australia.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The disclosure of all references referred to within this document are included herein in their entirety by way of reference.

The present inventor has conceived a novel coating technology that has application to reduce fouling in a variety of different contexts. Potential advantages of the inventive approach may include that it utilises safe and readily available materials, is suitable for use in food/beverage production and in a range of other industrial or domestic settings, does not appear to give rise to any damage or degradation of treated materials and can impart a long term anti-fouling effect upon treated substrates.

In a broad aspect the present invention is directed to a polysaccharide comprising coating and to substrates and apparatus comprising such a coating, which serves to reduce or prevent fouling of the substrate caused by contact from a fouling agent, in comparison to an equivalent uncoated substrate.

Throughout this specification and the accompanying claims the term "substrate" is intended to be interpreted broadly to encompass any material or surface that is subject to the build up of fouling or deposition, upon contact to a fouling agent. Such substrates can constitute single components, materials or elements or may constitute elements of a more complex apparatus. For example, the substrates to which coating technologies according to the invention can be applied can comprise one or more of metal, metal alloy, ceramic, glass, graphite, composite material, concrete or polymer.

Examples of metals and metal alloys include iron, steel, stainless steel, copper, gold, silver, platinum, brass, aluminium, nickel and tin.

Examples of ceramic and glass substrates include crystalline and non-crystalline ceramics, silicate glass, glass-ceramic, amorphous metal glass, silicon dioxide and graphene oxide.

The term "polymer" as it is used herein is intended to encompass homo-polymers, co-polymers, polymer containing materials, polymer mixtures or blends, such as with other polymers and/or natural and synthetic rubbers, as well as polymer matrix composites, on their own, or alternatively as an integral and surface located component of a multi-layer laminated sandwich comprising other materials e.g. polymers, metals or ceramics (including glass), or a coating (including a partial coating) on any type of substrate material. The term "polymer" encompasses thermoset and/or thermoplastic materials as well as polymers generated by plasma deposition processes.

The polymeric materials which can be coated according to the present invention include, but are not limited to, polyolefins such as low density polyethylene (LDPE), polypropylene (PP), high density polyethylene (HDPE), ultra high molecular weight polyethylene (UHMWPE), blends of polyolefins with other polymers or rubbers; polyethers, such as polyoxymethylene (Acetal); polyamides, such as poly(hexamethylene adipamide) (Nylon 66); polyimides; polycarbonates; halogenated polymers, such as polyvinylidenefluoride (PVDF), polytetra-fluoroethylene (PTFE) (Teflon™), fluorinated ethylene-propylene copolymer (FEP), and polyvinyl chloride (PVC); aromatic polymers, such as polystyrene (PS); ketone polymers such as polyetheretherketone (PEEK); methacrylate polymers, such as polymethylmethacrylate (PMMA); polyesters, such as polyethylene terephthalate (PET); and copolymers, such as ABS and ethylene propylene diene mixture (EPDM).

The substrates of the invention may include more than one of the types of materials outlined above, which may be in the form of bulk materials, processed, shaped, joined, moulded or otherwise formed materials that either are, or are components of, other apparatus. For example, apparatus including substrates that can be coated according to the invention include apparatus that is or are an element of food, dairy or beverage processing equipment; a pump, pipe, conduit, connector or plumbing fitting; a heat exchanger, radiator, heating element, hot water service, kettle or jug; a commercial or domestic appliance, washing machine, dish washer, clothes washing machine, air conditioner; a marine or aquatic vehicle, structure or fixture; a window, windscreen, lens, bottle or storage vessel; a building component or vehicle panel.

The term "fouling agent" is intended to encompass agents that, after a substrate has been exposed to them, result in the formation of build up, deposition or the like on the substrate surface. While the chemical and mechanical processes giving rise to fouling are likely to vary significantly depending upon the nature of the fouling agent, the substrate in question and the conditions to which they are exposed (such as temperature, pressure, pH, salt concentration) it is nonetheless understood, without wishing to be bound by theory, that coatings according to the invention can be effective to prevent or reduce fouling or deposition due to inhibition of initial adhesion of fouling agent derived species onto the substrate. Fouling agents, for example include water, particularly hard water, salt water, marine or aquatic environment (that may include water or salt water in combination with other agents such as bacteria, algae and other organisms), food and beverage, milk and other dairy derived substances such as milk fractions, yoghurt, cheese, cream, butter, ice-cream; raw or treated sewerage; industrial chemicals, petrochemicals, lubricants; fermentation broth and the like. Fouling agents according to the invention will generally take the form of a fluid, but may also include some solid or semi-solid materials. The period of exposure of a fouling agent to a substrate required to cause fouling will depend upon the nature of the fouling agent in question, the substrate and the conditions to which they are exposed. The coating according to the present invention has been shown to reduce or prevent fouling of the substrate caused by contact from the fouling agent. In this context the reduction or prevention of fouling is relative to the fouling that would be experienced by an equivalent substrate exposed to the same fouling agent under equivalent conditions. It is a simple matter for a skilled person to conduct such a comparative study to a substrate both with and without the coating of the invention.

After exposing the substrates to the same conditions and for the same period of time it is also a simple matter to monitor the extent of fouling. In many cases this will involve a simple visual inspection, while in other cases it may be necessary to adopt more sophisticated analytical techniques such as conventional light microscopy or scanning electron microscopy (SEM), possibly in conjunction with the use of surface etching techniques.

The substrates treated according to the invention with polysaccharide will in many cases, although not necessarily, give rise to increased surface hydrophilicity. The hydrophilic nature of the treated surface can readily be determined by conducting water drop contact angle analysis of both coated and uncoated surfaces. A water droplet contact angle of less than about 90°, such as less than about 80°, less than about 50° or less than about 30° is indicative of a hydrophilic surface. The coating according to the invention need not necessarily decrease the contact angle of the substrate relative to the uncoated form, although this is likely to happen in many cases.

The coatings according to the invention comprise polysaccharide and may additionally include other agents. Generally, however, polysaccharide will comprise a predominant component of a layer of the coating that is closely adjacent to the substrate. Other elements that may be included within the polysaccharide comprising layer or layers of the coating include, but are not limited to, oligosaccharide, ions such as calcium, sodium, potassium, hydroxide, and the like as well as protein and peptide. Particularly preferred polysaccharides that are incorporated into the coatings according to the invention include one or more of starch, modified starch, cellulose, hemicellulose, hydrolysed cellulose and cellulose derivatives. For example, the starch or modified starch can comprise one or more of rice starch, maize starch, potato starch, dextrin starch, hydrolysed starch, octenyl succinic anhydride (OSA) starch, alkaline-modified starch, bleached starch, oxidised starch, enzyme-treated starch, monostarch sulphate, distarch phosphate, acetylated starch, hydroxypropylated starch, hydroxyethyl starch, cationic starch and carboxymethylated starch.

For example, the cellulose, hydrolysed cellulose or cellulose derivative can comprise one or more of cellulose Iα cellulose Iβ, cellulose II, cellulose III, cellulose IV, cellulose acetate, cellulose triacetate, cellulose propionate, cellulose acetate propionate, cellulose acetate butyrate, cellulose nitrate, cellulose sulphate, methyl cellulose, ethyl cellulose, ethylmethyl cellulose, hydroxyethyl cellulose, hydroxypropyl cellulose, hydroxyethylmethyl cellulose, hydroxypropylmethyl cellulose, ethylhydroxyethyl cellulose, carboxymethyl cellulose and acid hydrolysed cellulose.

Mixtures of one or more members of the same or different categories of polysaccharides can also be adopted.

In a further aspect of the invention the coating can include an additional layer or layers comprising protein and/or polypeptide that is bound to the base polysaccharide comprising layer. Proteins or polypeptides that may be included within the coatings include one or more of whey protein and casein. Specific caseins that can be adopted include α-, β- and k-casein.

In one aspect of the invention the protein comprises casein. In another aspect, the polysaccharide comprises dextrin starch and/or octenyl succinic anhydride starch and in a further embodiment the coating comprises dextrin starch and/or octenyl succinic anhydride starch in combination with casein.

In another broad aspect the invention relates to a method of reducing or preventing fouling of a substrate intended in use to contact a fouling agent, in comparison to an equivalent untreated substrate, which comprises treating the substrate with aqueous polysaccharide to produce a polysaccharide comprising coating on the substrate.

By reference to treating the substrate with "aqueous polysaccharide" it is intended to outline that polysaccharide, as outlined above, can be included in aqueous solution or as a mixture or dispersion in water, depending upon the form that the polysaccharide takes. Generally, the aqueous polysaccharide will include from about 0.5% to about 20% by weight of the polysaccharide to weight of the water, for example 1.0% to about 15%, 2% to about 10% or about 4% to about 8%. Depending upon the nature of the substrate the aqueous polysaccharide may be provided within a receptacle or bath into which the substrate is immersed, the aqueous polysaccharide can be sprayed or otherwise projected onto the substrate or the aqueous polysaccharide can be pumped through apparatus comprising internal surfaces as substrate to be exposed to the coating treatment of the invention. The aqueous polysaccharide can include other components such as buffering or pH adjusting agents such as lactic acid, hydrochloric acid and sodium hydroxide and can, in one embodiment be adjusted to pH of from about 3 to about 10, such as from about 5 to about 8. Although not essential, it is also preferred that the aqueous polysaccharide is temperature controlled during the treatment such that the treatment is conducted for example at a temperature from about 50° C. to about 150° C., such as from about 65° C. to about 140° C. or about 85° C. to about 120° C. The treatment may be conducted, for example, for a period of from about 1 hour to about 48 hours, such as from about 4 hours to about 12 hours or from about 4 hours to about 6 hours. For example, in embodiments of the invention where surfaces of fluid processing apparatus are to be coated it may be appropriate for the aqueous polysaccharide to be pumped through the apparatus for example at a rate of from about 5 L/min to about 100 L/min, such as from about 15 L/min to about 70 L/min or from about 20 L/min to about 40 L/min. For example in the case of dairy processing equipment including heat exchangers it is convenient to run the aqueous polysaccharide through the heat exchanger apparatus with the heat exchanger in operation to control temperature, for example within the ranges outlined above.

In another aspect of the invention the treatment with aqueous polysaccharide is followed by a separate treatment with an aqueous mixture, dispersion or solution of protein or polypeptide, as outlined above. Rinsing of the substrate with water can be conducted following the initial aqueous polysaccharide treatment and prior to treatment with aqueous protein or polypeptide.

The treatment with aqueous protein or polypeptide can be conducted in much the same way as the treatment with aqueous polysaccharide, for example by immersing the substrate to be treated in a receptacle comprising the aqueous protein or polypeptide, by spraying or flowing the aqueous protein or polypeptide through an apparatus comprising the substrate to be treated on its internal surfaces.

The aqueous mixture, dispersion or solution of protein or polypeptide, for example whey protein or casein, can be from about 2% to about 16%, such as from about 8% to about 14%, by weight of protein or polypeptide to weight of water and in another embodiment it is possible to use milk or a milk fraction as the protein or polypeptide comprising mixture, dispersion or solution. By reference to a milk fraction it is intended to refer to a casein comprising component derived from milk that may have had elements of normal milk partially or completely removed, such as fats, sugars, proteins or water. It is also possible to conduct the treatment with milk that has been diluted with other agents such as water or aqueous salt solution.

Preferably the pH of the aqueous protein or peptide is from about 4 to about 10, such as from about 6 to about 8 and the substrate can suitably be exposed to the aqueous protein or polypeptide at a temperature from about 65° C. to about 98° C. or from about 75° C. to about 95° C., such as from about 90° C. to about 95° C. Preferably, however, the aqueous protein or polypeptide will be maintained below 100° C. The treatment can, for example, be conducted for a period of from about 15 minutes to about 6 hours, such as from about 30 minutes to about 4 hours or from about 1 hour to about 2 hours. In the case where the aqueous protein or peptide is to be pumped through apparatus comprising substrate to be treated on its internal surfaces the flow rate can conveniently be from about 20 L/min to about 100 L/min, such as from about 30 L/min to about 70 L/min or from about 40 L/min to about 50 L/min.

In one aspect of the invention rinsing with water is conducted following the treatment with aqueous protein or polypeptide and this rinsing can conveniently be conducted at a temperature of from about 20° C. to about 80° C., such as from about 25° C. to about 50° C. or about 30° C. to about 40° C., for a period of between about 5 mins and about 2 hours, such as from about 10 mins to about 1 hour. In another aspect rinsing can be conducted at a temperature of from about 20° C. to about 80° C., such as from about 25° C. to about 60° C., for a period of between about 5 mins and about 2 hours, such as from about 30 mins to about 1 hour utilising dilute alkali, such as sodium hydroxide, potassium hydroxide or the like, for example at a concentration of from about 0.1 wt % to about 5 wt %, such as from about 0.5 wt % to about 2 wt %.

The invention relates not only to the coatings of the invention as discussed above and to substrates and apparatus comprising them and to the methods for producing such coatings, but also to the coatings and substrates and apparatus when produced by the methods outlined above.

The present invention will be further described by way of example only with reference to the following non-limiting examples.

EXAMPLES

Example 1—Analysis of Milk Fouling Using a Plate Heat Exchanger as Substrate and Cooling Water Fouling Using a UHT Heat Exchanger as Substrate Materials and Methods
Coating of Substrates Polysaccharide (in this case, 35% dextrin starch was mixed with 65% OSA starch and the final concentration of the mixture in water was 8.5% (w/w) with the pH around 3.5) was dissolved in water at 55° C. and heated up to 85° C. Solution was pumped into the heat exchanger and circulated for 4 hours and temperature was kept at 95° C. with the flow rate of 17 L/min for the plate heat exchanger and 35-40 L/min for the UHT heat exchanger. The polysaccharide solution was drained after 4 hours. Protein solution (80% casein (containing calcium) was mixed with 20% whey proteins with the final concentration of 12% (w/w) in water, pH at 6.7) was dissolved below 50° C. and pumped into the heat exchanger with the same flow rate of the polysaccharide solution. Protein solution was circulated for 2 hours at 85° C. The protein solution was then drained and the heat exchanger was rinsed with water or diluted sodium hydroxide (if necessary). The heat exchanger was cooled to room temperature before use.

In the plate heat exchanger coating process, the plates were not taken apart from the processing line. Instead the coating solutions were pumped into the plate heat exchanger in both the product and the hot media side. In this way, the heat exchanger plates were exposed to full contact with the coating solutions to form anti-fouling film.

Fouling experiments were carried out using a plate heat exchanger (productivity 2 t/h) in Shandong Kangzhiduo Dairy Co., Ltd. as the substrate. Fresh milk was supplied by the same company and samples were heated to 90° C. during processing. Platinum resistance probes were installed to characterize thermal performance. The probes were used to measure the inlet and outlet temperatures of both the test fluid and the hot media. Thermal balance was calculated as described in Equations 1 and 2 below and the overall heat transfer coefficient U is known. During the fouling process, U decreased with time in the uncoated trials.

Logarithmic mean temperature difference (LMTD) which is the driving force of heat transfer, and the mean value, conform to following formula:

$$\Delta T_{LMTD} = \frac{(T_{02} - T_{i1}) - (T_{i2} - T_{01})}{\ln\frac{(T_{02} - T_{i1})}{(T_{i2} - T_{01})}} \quad \text{(Equation 1)}$$

Where, $\Delta T_{LMTD}$=logarithmic mean temperature difference (LMTD) (K)
$T_{O1}$=product outlet temperature (K)
$T_{O2}$=hot medium outlet temperature (K)
$T_{i1}$=product inlet temperature (K)
$T_{i2}$=hot medium inlet temperature (K)

Overall heat transfer coefficient (U) tells how much heat passes through 1 m² of the partition per 1° C. of differential temperature (Incropera and DeWitt 1996). In a heat exchanger U should be as high as possible (Incropera and DeWitt 1996).

The general formula is:

$$\Delta T_{LMTD} \cdot U \cdot A = m_1 \times c_{p1} \times (T_{O1} - T_{I1}) = m_2 \times c_{p2} \times (T_{I2} - T_{O2}) \quad \text{(Equation 2)}$$

Where,
A=heat transfer area (m²)
m=mass of the fluids (Kg)
$c_p$=specific heat capacity of the media (J·Kg⁻¹·K⁻¹)
$\Delta T_{LMTD}$=logarithmic mean temperature difference (LMTD) (K)
U=overall heat transfer coefficient (W·K⁻¹·m⁻²)

All the trials were performed for at least 2 hours for each run (8 hours testing was also carried out to test the extended term performance of the coating) and after initial testing of the coating treatment the heat exchanger was continuously used in normal production and 10 months data was analysed. All results reported are the average of triplicate experiments. The thermal performance between modified steel surface and reference steel were compared. To allow comparison, the normalized overall heat transfer coefficient U*(t) was calculated as follows:

$$U^*(t) = \frac{U(t)}{U_0} \quad \text{(Equation 3)}$$

Where, $U_0$=heat transfer coefficient when the plate heat exchanger is clean t=the operating time For each run the U*(t) starts from 1.

A UHT heat exchanger (Primo D, Tetra Pak, productivity 4 t/h) in Jinan Jiabo Milk Co., Ltd. was used to carry out cooling water anti-fouling tests. Direct energy saving on the cooling water side results were provided by Jinan Jiabo Milk Co., Ltd. During the test, tap water was used directly as the cooling media without any further treatment. The cooling water tubes were removed from the heat exchanger and tested each month.

Surface Characteristics Analysis (a) Contact Angle Measurement

Experiments microscope glass slides and same sized stainless steel 304 slides were cleaned using ethanol and distilled water. With or without SLLC treatment, the slides were extensively washed with distilled water and rested 5 days at room temperature before testing. The contact angle was measured using 10 uL water with a Data Physics Tensiometer OCA 20 at room temperature and its image analysis software SCA 20 were used to measure the contact angle in School of Chemistry, University of Melbourne.

(b) SEM Imaging

A microscope slide sized stainless steel 304 chip surface coated according to the invention was imaged by a Philips XL30 field-emission scanning electron microscope in the School of Botany, University of Melbourne.

(c) Compositional and Trace Element Analysis

Elemental compositional analysis was carried out by the China National Analysis Centre for Iron and Steel (NACIS) based on standard protocols, as follows:

The composition of stainless steel was analysed based on the following Chinese National standard and NACIS standard: C, S: Infrared absorption method after combustion in an induction furnace (Standard: GB/T 20123-2006), Si: Inductively coupled plasma atomic emission spectroscopy (ICP-AES) (Standard: NACIS/C H 116: 2005), Mn, Ni: ICP-AES (Standard: NACIS/C H 008: 2005), P: ICP-AES (Standard: NACIS/C H 011: 2005), Cr: Ammonium Peroxydisulfate Titration (Standard: NACIS/C H 116: 2005), N: Thermal conductimetric method after fusion in a current of inert gas (Standard: GB/T 20124-2006/ISO 15351: 1999).

(d) Dissolved Element Analysis

Test results were provided by the NACIS based on the method for analysis of hygienic standard of stainless steel of China (standard: GB/T 5009.81-2003), stainless steel slides with and without coatings were submerged in 4% (v/v) acetic acid and boiled for 90 min then kept in the acid at room temperature for 24 h. Dissolved elements in the acid were measured by inductively coupled plasma mass spectrometry (ICP-MS).

Results

Fouling on the Plate Heat Exchanger

Figure 2:
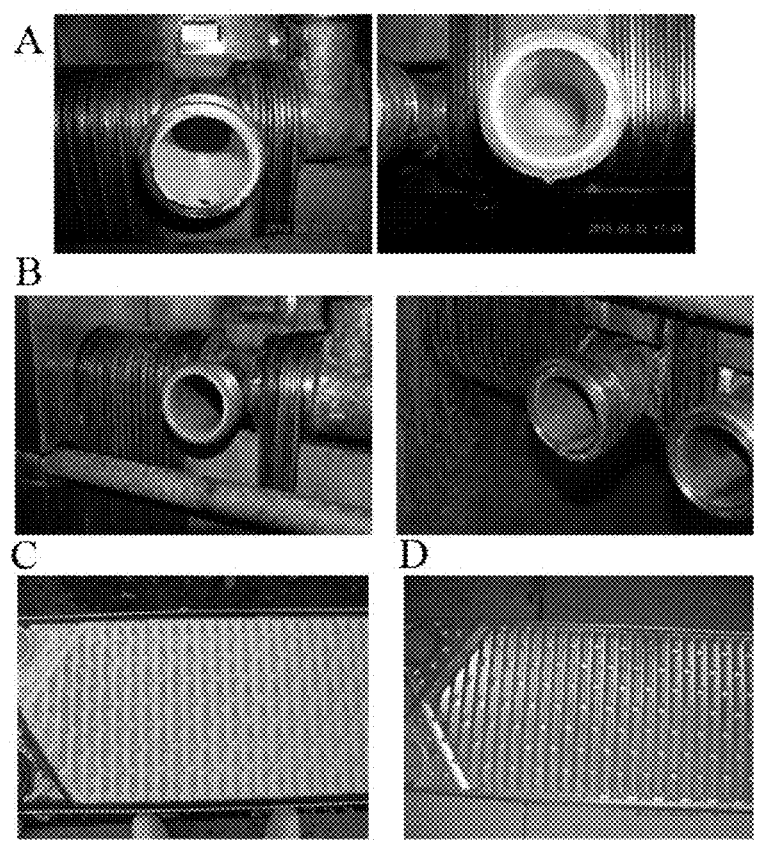
FIG. 2 shows images of milk fouling before and after coating treatment following 8 h of thermal processing, wherein A show the heat exchanger inlet (left) and outlet (right) before coating treatment, B show the heat exchanger inlet (left) and outlet (right) after coating treatment, C is the heat exchanger plate before coating treatment and D is the heat exchanger plate after coating treatment.

Before the coating treatment, the overall heat transfer coefficient of the bare reference steel decreased over 16%, as shown in FIG. 1, during 2 h testing, while the heat transfer coefficient of the coated heat exchanger dropped less than 2%, even after 10 months of processing (with the CIP process after each run to test the chemical resistance). After 8 h milk thermal processing, images (FIG. 2) were taken immediately (the inlet and outlet of the heating section) or after rising with water until the heat exchanger was cooled (exchanger plates). As shown in these images, after the coating treatment there was less deposition on the heat exchanger and most of the fouling was removed after rinsing with water. A long lasting anti-fouling film was built up on the heat exchanger, after 10 months running the film was still effectively maintaining heat transfer efficiency during milk thermal processing.

Water Fouling

Figure 3:
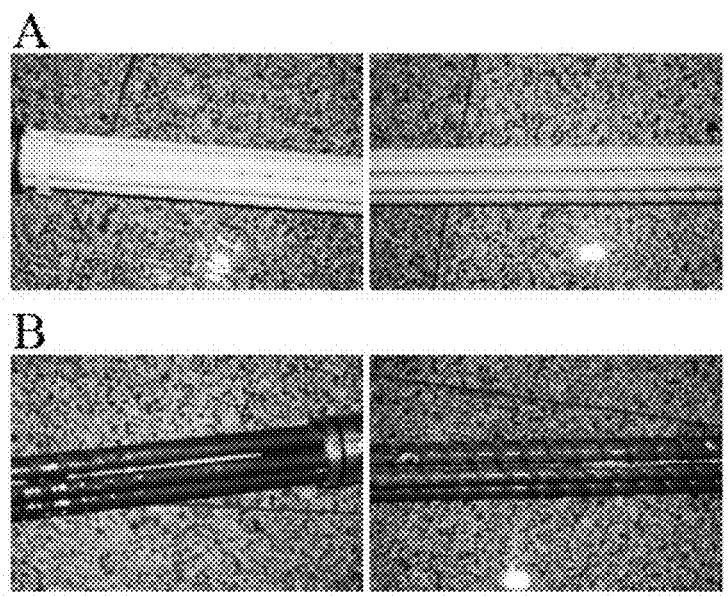
FIG. 3 shows images of water scaling after one month of continuous thermal processing wherein the upper images, A are the cooling water tubes before coating treatment and the lower images, B, are the cooling water tubes after coating treatment.

Cooling water fouling tests were carried out in Jinan Jiabao Milk Co., Ltd and a Tetra Pak UHT heat exchanger was used. The anti water scaling data was provided by Jiabao Milk before and after the coating treatment. As shown in FIG. 3, after the coating treatment the amount of water scaling on the cooling tubes decreased dramatically and cleaning frequency was able to be reduced from monthly to three monthly. At least 65 Kg 0.9 MPa saturated steam was saved for each cleaning process. The acid concentration dropped 30% compared to the untreated surface.

Contact Angle Measurement

Contact angle measurement was used to analyse surface characteristics of the coated surfaces. The contact angle measurement was taken immediately, given its dependence on contact time in air (Mantel and Wightman 1994). The coating treatment can lead to different alterations on different materials. As the results provided in Table 1 demonstrate, after coating treatment the contact angle of stainless steel went up slightly while that of the glass sample was reduced. The reason for these changes could be complicated. The wettability of a liquid on a clean surface of a solid substrate normally depends primarily on short-range interfacial forces operating over distances between atoms. While for this case of a coating layer on the substrate surface, this layer will separate the liquid (water) from the surface to a distance beyond the range of these short-range forces.

TABLE 1

Water drop contact angle for stainless steel and glass with coatings

| Surfaces | Treatment | Contact angle (°) |
| --- | --- | --- |
| Stainless steel | Untreated | 82.4 |
|  | Coated | 85.7 |
| Glass | Untreated | 46.9 |
|  | Coated | 37.5 |

SEM and Steel Compositional Analysis

Figure 4:
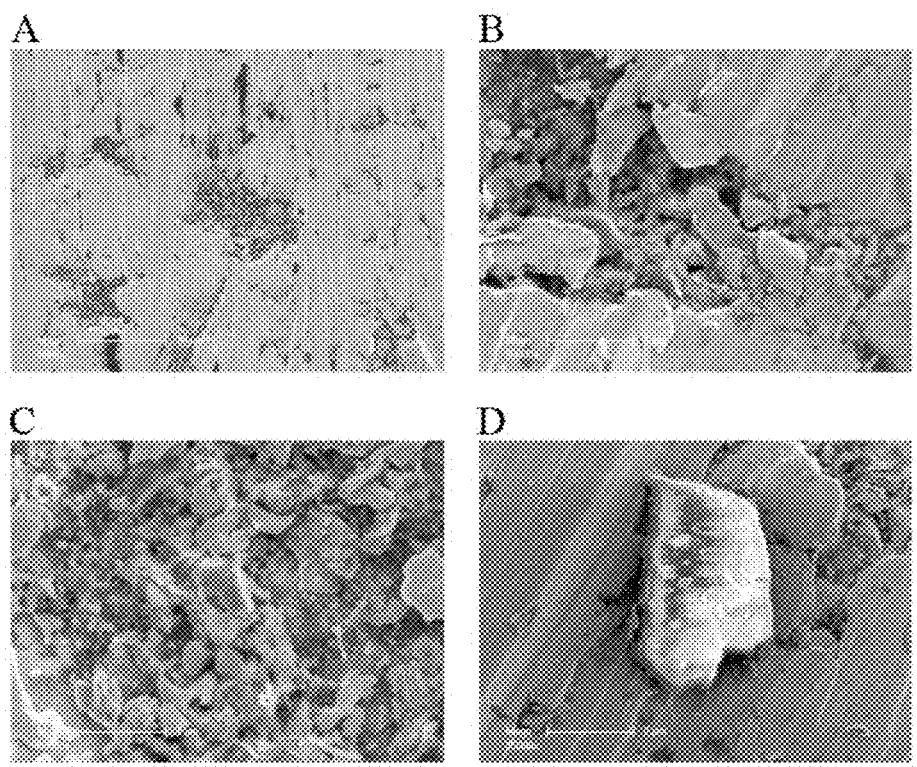
FIG. 4 shows SEM Images of coated stainless steel 304, wherein A and B are partly etched coated surfaces; C is the bottom layer structure and D is the top layer structure.

SEM images were taken from partly etched stainless steel slides coated according to the invention to look at the different layers of the coating film (shown in FIG. 4). The bottom layer is relatively amorphous and includes complex structures, while the top layer is smooth.

The results for the elemental analysis study (Table 2) demonstrated that the coating treatment did not result in damage to the stainless steel surface, as the composition of each main element within the stainless steel substrate was essentially unchanged. On the other hand, the anti-fouling coating was demonstrated to increase the chemical resistance of the stainless steel surface, especially to dilute acid. The coated stainless steel surface released 60% less Cr and more than 50% less Ni to the acid solution (Table 3). This improved chemical resistance of the stainless steel would be expected to give rise to improved long term heat exchanger performance.

TABLE 2

Composition of stainless steel

| Samples | Element (%) | | | | | | | |
|---|---|---|---|---|---|---|---|---|
| | C | Si | Mn | P | S | Cr | Ni | N |
| Standard ($Cr_{18}Ni_9$) | ≤0.15 | ≤0.75 | ≤2.00 | ≤0.045 | ≤0.030 | 17.00-19.00 | 8.00-10.00 | ≤0.1 |
| Uncoated Sample | 0.059 | 0.41 | 1.05 | 0.031 | 0.0043 | 18.09 | 8.02 | 0.045 |
| Coated Sample | 0.059 | 0.41 | 1.06 | 0.028 | 0.0043 | 18.15 | 8.03 | 0.046 |

TABLE 3

Dissolved Elements Analysis

| | Elements (mg/L) | | | | |
|---|---|---|---|---|---|
| | Cr | Ni | As | Cd | Pb |
| Standard (GB 9684-88) | ≤0.5 | ≤3.0 | ≤0.04 | ≤0.02 | ≤1.0 |
| Uncoated | 0.18 | 0.26 | <0.01 | <0.01 | <0.01 |
| Coated | 0.06 | 0.11 | <0.01 | <0.01 | <0.01 |

Conclusions

The coating was tested as an anti-fouling technology in both in the contexts of milk fouling and water scaling. During thermal processing, the coated heat exchanger was shown to efficiently maintain heat transfer coefficient in comparison to the uncoated reference steel. Cleaning efficiency of the coated substrates was also significantly improved and there was no harm or alteration to the heat exchanger surfaces. The coating was also shown to provide some protection for the stainless steel substrates from acid induced degradation.

Example 2—Analysis of Milk Fouling Using a Dairy Processing Production Line as Substrate Materials and Methods
Coating of Substrates Polysaccharide (in this case, 35% dextrin starch was mixed with 65% OSA starch and the final concentration of the mixture in water was 9% (w/w) with the pH around 3.5) was dissolved in water at 85° C. Solution was pumped into the heat exchanger and circulated for 5 hours and temperature was kept at 95° C. with the flow rate of 10 L/min for the Amotec-THE heat exchanger and 80 r/min stirring speed for the pot heat exchanger. The polysaccharide solution was drained after 5 hours. Protein solution (80% casein (containing calcium) was mixed with 20% whey proteins with the final concentration of 12% (w/w) in water, pH at 6.7) was dissolved below 50° C. and pumped into the heat exchanger with the same flow rate and stirring speed of the polysaccharide solution. Protein solution was circulated for 1 hour at 90° C. The protein solution was then drained and the heat exchanger was rinsed with water or diluted sodium hydroxide (if necessary). The heat exchanger was cooled to room temperature before use.

Following treatment the effectiveness of the coating at reducing milk fouling on components of the production line was tested under two separate conditions by using both the Amotec-THE and the pot heat exchanger at ESTAVAYER LAIT SA (ELSA) in Estavayer-le-lac, Switzerland. Milk samples (with and without thickener) were supplied by the same company and samples were heated to 145° C. in the Amotec-THE for 6 hours at a flow rate of 150 L/h and 95° C. in the pot heat exchanger for 1 hour at a stirring speed of 100 r/min.

Results

Before the coating treatment, in the pot heat exchanger it was necessary to clean the apparatus utilising 15 to 20 minutes of cleaning with 70° C. alkali for deposition from milk samples without thickener. After the treatment it was possible to readily remove any deposits in two minutes simply using a 70° C. water wash, without the need for addition of alkali. In the case of testing milk samples with thickener, the cleaning time using the same alkali cleaning conditions as above was reduced from 35 minutes to 5 minutes.

Following the coating of coating treatment at Amotec-THE heat exchanger, there was visibly less deposition observable on production line components by process engineers than could be observed in the case of the same extreme condition exposure without the prior coating treatment.

It is to be recognised that the present invention has been described by way of example only and that modifications and/or alterations thereto which would be apparent to persons skilled in the art, based upon the disclosure herein, are also considered to fall within the spirit and scope of the invention.

REFERENCES

Bansal, B. and X. D. Chen (2006). Analysis of milk fouling in an ohmic heater: effect of temperature and power frequence. Fouling, cleaning and disinfection in food processing, The University of Cambridge.

Beuf, M., G. Rizzo, et al. (2004). Fouling and Cleaning of Modified Stainless Steel Plate Heat Exchangers Processing Milk Products. ECI Conference on heat exchanger fouling and cleaning. P. Watkinson, H. Müller-Steinhagen and M. Reza Malayeri.

Burton, H. (1968). "Reviews of the progress of dairy science. Section G: Deposit from whold milk in heat treatment plant—a review and discussion." Journal of Dairy Research 35: 317-330.

Changani, S. D. and M. T. Belmar-Beiny (1997). "Engineering and chemical factors associated with fouling and cleaning in milk processing." Experimental Thermal and Fluid Science 14(4): 392-406.

Chen, X. D. and P. Bala (1998). Investigation of the influences of surface and bulk temperature upon fouling of milk components onto a stainless steel probe. Fouling and cleaning in food processing, University of Cambridge, Official publications of the European Communities.

Chen, X. D. and J. Chen (2001). Modelling whey protein based fouling of heat exchangers—further examining the deposition mechanisms. International Conference on Heat Exchanger Fouling Fundamental Approaches and Technical Solutions, Davos, Switzerland.

de Jong, P. and S. Bouman (1992). "Original Papers and Proceedings: Fouling of heat treatment equipment in relation to the denaturation of β-lactoglobulin." International Journal of Dairy Technology 45(1): 3-8.

Delplace, F., J. C. Leuliet, et al. (1997). "A reaction engineering approach to the analysis of fouling by whey proteins of a six-channels-per-pass plate heat exchanger." Journal of Food Engineering 34(1): 91-108.

Delsing, B. M. A. and J. Hiddink (1983). "Fouling of heat transfer surfaces by dairy liquids." Netherlands milk and dairy journal 37(3): 139-148.

Incropera, F. P. and D. P. DeWitt (1996). Introduction to Heat Transfer, John Wiley & Sons.

Lalande, M., J.-P. Tissier, et al. (1984). "Fouling of a plate heat exchanger used in ultra-high-temperature sterilization of milk." Journal of Dairy Research 51(04): 557-568.

Liu, Z., P. Chan, et al. (2010). Influence of adsorption pre-treatment on the extent of dairy fouling of heat transfer surfaces. Fouling and cleaning in food processing, Cambridge, UK.

Mantel, M. and J. P. Wightman (1994). "Influence of the surface chemistry on the wettability of stainless steel." Surface and Interface Analysis 21(9): 595-605.

Sultan Khan, M., Z. M. Zubair, et al. (1996). "Fouling resistance model for prediction of CaCO3 Scaling in ALSI 316 tubes." Heat and Mass Transfer 32: 73-79.

The relevant teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A heat exchanger or production line apparatus comprising a metal or metal alloy substrate on an internal surface thereof intended in use to contact a fouling agent, said substrate including a coating comprising polysaccharide and protein bound to the polysaccharide wherein the polysaccharide comprises dextrin starch and octenyl succinic anhydride starch and the protein comprises casein, which coating serves to reduce or prevent fouling of the substrate caused by contact from the fouling agent, in comparison to an equivalent uncoated substrate.

2. The apparatus of claim 1 wherein the substrate comprises stainless steel.

3. The apparatus of claim 1 wherein the apparatus is or is an element of food, dairy or beverage processing equipment.

4. The apparatus of claim 1 wherein the apparatus is, or is an element of, a heat exchanger.

5. A method of reducing or preventing fouling of a metal or metal alloy substrate intended in use to contact a fouling agent, in comparison to an equivalent untreated substrate, which comprises treating the substrate with aqueous polysaccharide to produce a polysaccharide comprising coating on the substrate, further comprising treating the polysaccharide coated substrate with an aqueous mixture, dispersion or solution of protein, wherein the polysaccharide comprises dextrin starch and octenyl succinic anhydride starch and the protein comprises casein; wherein said substrate is a component of a heat exchanger or an internal surface of production line apparatus.

6. The method of claim 5 wherein treating the substrate with aqueous polysaccharide is conducted using an aqueous mixture, dispersion or solution of polysaccharide of from about 0.5% to about 20% w/w.

7. The method of claim 6 wherein the pH of the aqueous mixture, dispersion or solution of polysaccharide is from about 5 to about 8.

8. The method of claim 6 wherein the substrate is treated with said aqueous mixture, dispersion or solution of polysaccharide at a temperature of from about 50° C. to about 150° C.

9. The method of claim 5 wherein the aqueous mixture, dispersion or solution of casein comprises milk or a casein comprising milk fraction.

\* \* \* \* \*